May 14, 1957 W. STACKHOUSE 2,792,233
BAGGAGE TRUCK
Filed Jan. 20, 1954 2 Sheets-Sheet 1

INVENTOR.
WELLS STACKHOUSE
BY
Kenway, Jenney, Witter & Hildreth
ATTORNEYS

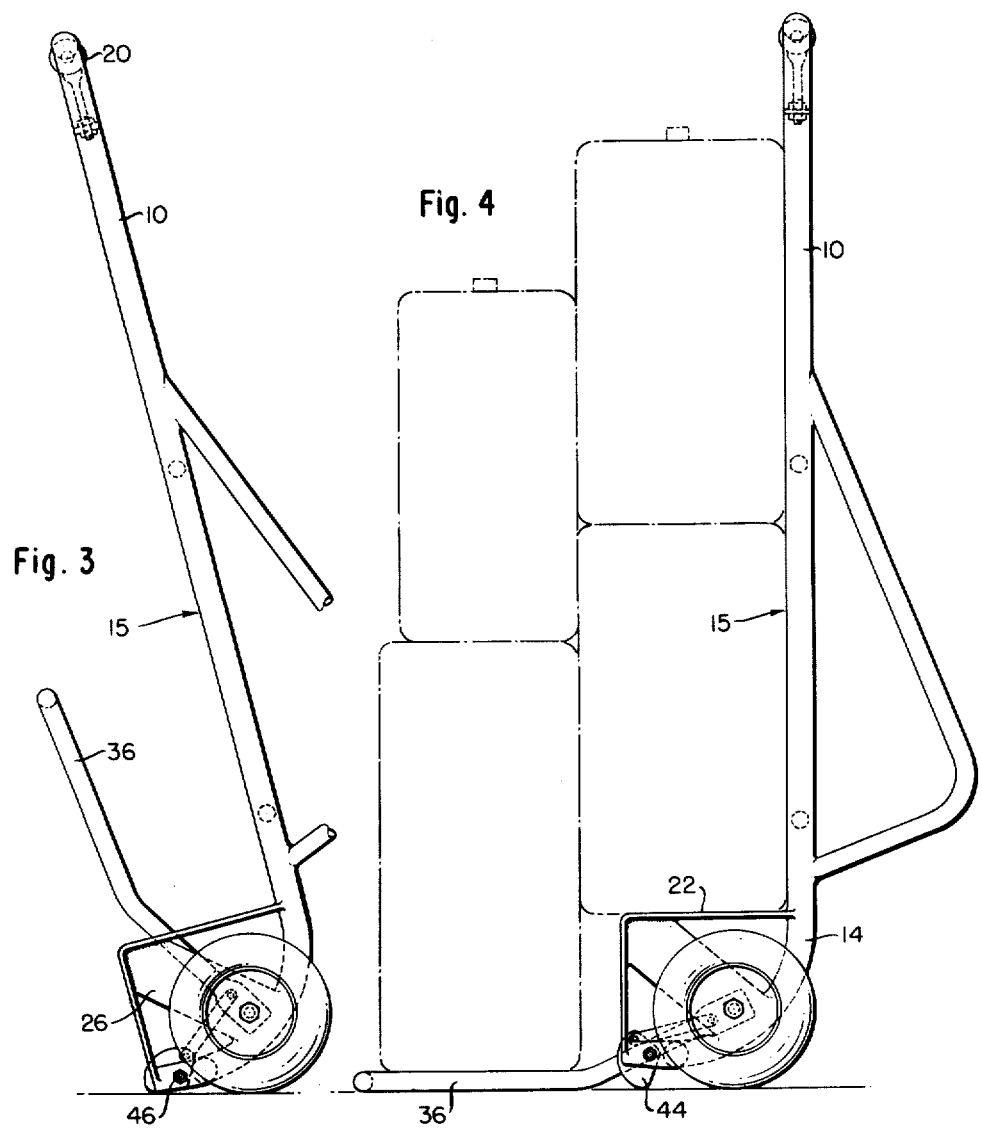
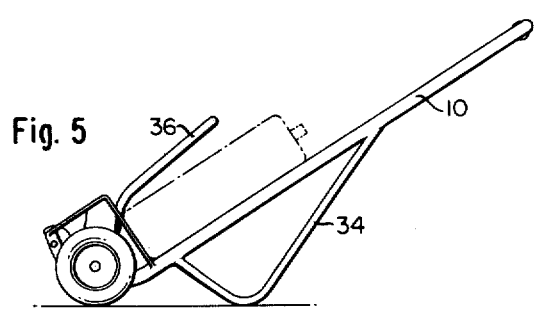

2,792,233

Patented May 14, 1957

1

2,792,233

BAGGAGE TRUCK

Wells Stackhouse, Havertown, Pa., assignor to American Locker Company, Inc., Boston, Mass., a corporation of Delaware Application January 20, 1954, Serial No. 405,132

6 Claims. (Cl. 280—47.28)

This invention relates to an improved hand truck particularly adapted to be employed in the handling of personal baggage at passenger traffic terminals. The labor market has decreased the available "Red Cap" supply to a degree where passengers are now required in large measure to attend to the handling of their baggage and my improved truck embodies novel features adapting it to serve this function, particularly in association with a coin controlled truck dispensing unit of the nature described in my copending application Serial No. 374,324 filed August 14, 1953. An important feature of the invention resides in the employment of roller bearings carried by the trucks and adapted to support them in compact dispensing alignment on a supporting rail.

My improved truck is so constructed from strong and light weight material that it handles with minimum manual effort and its novel design adapts it to support one of a plurality of bags varying in size. The design includes an auxiliary frame pivoted to the truck and adapted in extended position substantially to increase the bag loading and carrying capacity of the truck. In its retracted position the frame is disposed adjacent to the main load supporting platform on which bags can be loaded beneath the frame.

When idle and with the auxiliary frame retracted, the truck is balanced to rest in upright position above its wheel supporting axis, thus occupying a minimum of floor space and avoiding objectionable traffic obstruction possibilities. In this position the truck is slightly inclined forwardly from the vertical with its center of gravity disposed forwardly of the wheel supporting axis. When the auxiliary frame is in extended position and loaded with bags it is desirable when at rest that the truck shall be maintained in upright vertical position with the bags thereon also in vertical position. A further feature of the invention resides in the employment of floor engaging abutments connected to the auxiliary frame and adapted to serve this function. Movement of the frame to extended position projects the abutments forwardly to a position maintaining the truck vertical and movement of the frame to folded position retracts the abutments and permits the truck to lean forwardly to the inclined idle position. The production of a new baggage truck embodying this improved feature comprises a further object of the invention.

These and other features of the invention will be more readily understood and appreciated from the following detailed description of a preferred embodiment thereof selected for purposes of illustration and shown in the accompanying drawing in which:

Fig. 3 is a side elevation of Fig. 1,

Fig. 4 is a side elevation of the extended truck loaded with a plurality of bags, and Fig. 5 illustrates the truck in bag loading position.

2

Figures 1, 2:
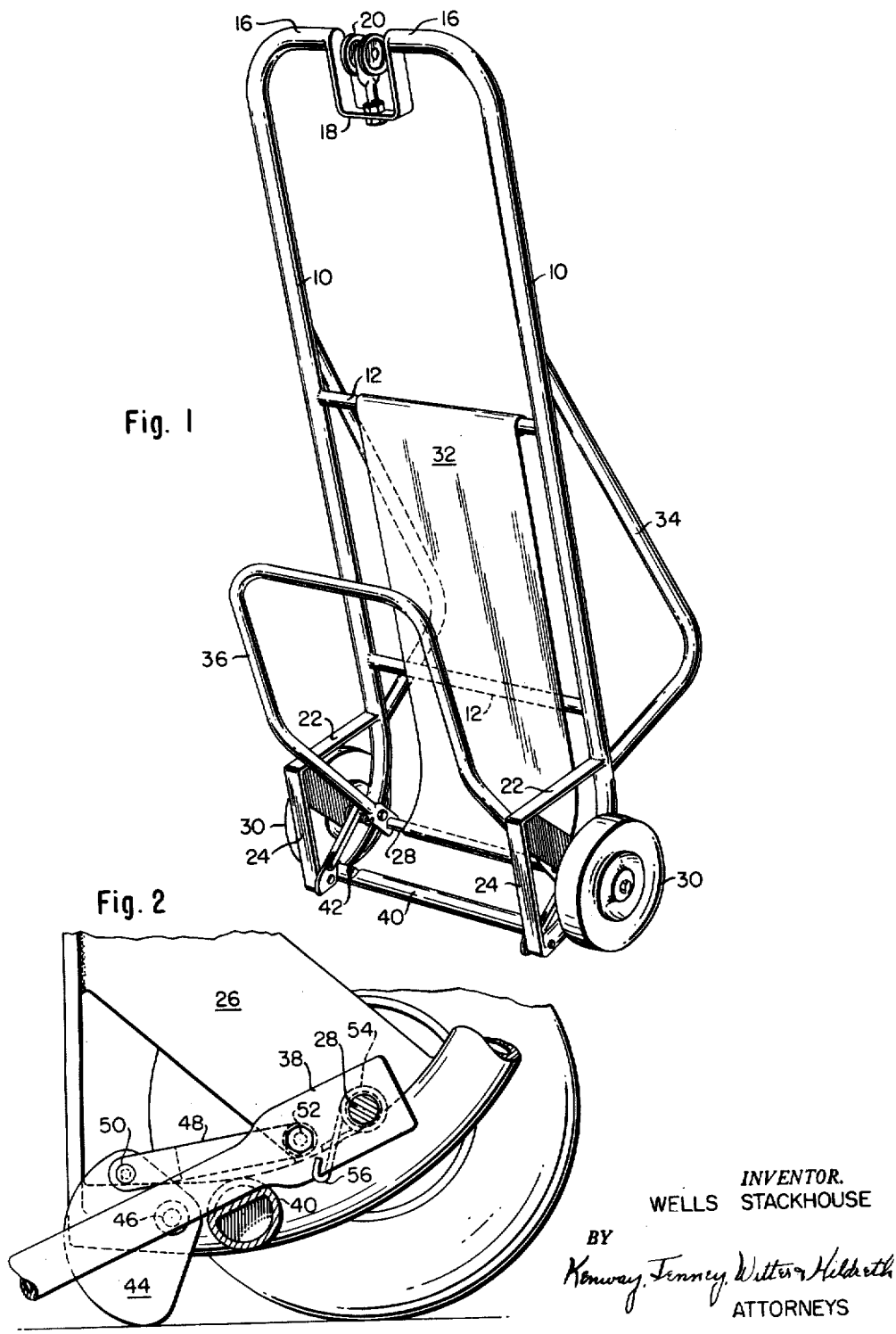
Fig. 1 is a perspective view of my improved baggage truck in upright position.
Fig. 2 is an enlarged fragmentary view of the bottom end of the truck.

In its preferred form my baggage handling truck embodies two substantially parallel side members spaced apart and comprising two relatively long straight portions 10 connected together at 12 to form a substantially flat bag supporting platform 15 at its front face and two curved portions 14 at the bottom end extending laterally outwardly and forwardly from said face in substantially parallel curves. The top ends of the side members are connected together to form hand gripping handles 16. This connection, as illustrated in Fig. 1, includes a U-shaped intermediate portion 18 on which is supported, within the peripheral margin of the end, a roller bearing 20 for supporting the truck on a rail as described in my said copending application.

Two brackets secured respectively to the front concave sides of the curved portions 14 include two straight and parallel bag supporting bars 22 connected right angularly at one end to the portions 10 adjacent to their junctions with the curved portions 14 and supported at their outer ends by bars 24 connected thereto and to the free ends of the curved portions. Each bracket also includes a plate 26 extending from its outer corner inwardly and fixed intermediately to its curved portion 14. An axle 28 extends through the plates 26 and carries two truck wheels 30 on its ends.

A sheet 32 preferably of light weight metal is carried on the axle and connections 12 at the bag supporting platform 15, the sheet extending below the bars 22 which cooperate with the main platform 15 to support the bags on the truck. Supporting brackets 34 are fixed to and extend rearwardly from the side portions 10 for supporting the truck in the bag loading position illustrated in Fig. 5.

An auxiliary load supporting frame 36 is provided on the truck for cooperating with the platform 15 and bars 22 to support a greater number of bags as required. This frame is illustrated as comprising a U-shaped metal tube having the free ends 38 of its two legs flattened and pivoted to the axle 28. The frame is pivotally movable from the folded position illustrated in Figs. 1, 3 and 5 to the extended position illustrated in Fig. 4. In the folded position the frame is disposed adjacent to but spaced from the platform 15 sufficiently to receive a bag therebetween, as shown in Fig. 5, and in the extended position it is substantially right angular to the platform. In the extended position the frame, together with the platform 15 and bars 22, is adapted to support a substantial load of bags as illustrated in Fig. 4, the folded position of the frame (Figs. 3 and 5) permitting the truck to receive and support a lighter load. The free ends of the curved portions 14 are connected by a tubular piece 40 which forms a stop for the frame 36 at 42.

As illustrated in Figs. 1 and 3, the truck when idle is adapted to rest in upright position, thus consuming a minimum of floor space and avoiding dangerous floor obstruction to traffic. In this idle position, the frame 36 is in its fully folded position and the truck is supported on the wheels 30 and on the forward front end of the truck. The bag supporting platform 15 is inclined forwardly from the vertical and the center of gravity of the truck is disposed forwardly of the axle 28. The mounting of the truck on wheels 30 rotatable on an axis extending through the plates 26 of the bag supporting brackets at the upper and concave side of the curved portions 14 serves to balance and support the load at a low center of gravity and thus facilitate the hand manipulation of the loaded truck.

When the truck is loaded with the frame 36 extended it is desirable that it shall remain at rest in vertical upright position, Fig. 4, rather than in the inclined position of Fig. 3 or the loading position of Fig. 5. In such vertical position the bags remain stable on the truck on a minimum of floor space and can be conveniently removed therefrom. The following mechanism is provided for this purpose.

Two floor engaging abutment members 44 are pivoted at 46 to the forward ends of the curved portions 14. Each such member is connected to the adjacent leg of the frame 26 by a link 48 pivoted to the member at 50 and to the frame at 52. When the frame is in folded position the members are retracted as illustrated in Figs. 1 and 3. Movement of the frame to extended position pivots the members downwardly to a forward floor engaging position in which they support the truck vertically as illustrated in Figs. 2 and 4. A pair of springs 54 coiled about the axis 28 have end portions 56 engaging the frame and normally holding it in the folded position.

It is desirable that the truck shall be of light weight and sturdy construction and it is preferably made largely of tubular aluminum or other light weight metal with the various elements rigidly fused or welded together. It will be apparent that a truck of this nature is well adapted to serve the dispensing and utility functions described and provides a needed service to the traveling public at minimum expense.

Having thus disclosed my invention what I claim as new and desire to secure by Letters Patent is:

1. A baggage truck comprising two substantially parallel side members spaced apart and comprising two relatively long straight portions connected together to form a substantially flat bag supporting platform therebetween at the top face of the truck and two curved portions at the bottom end of the truck extending laterally outward from said face in substantially parallel curves, means connecting the members at the top end of the truck and forming a hand gripping handle, two brackets secured respectively to the concave sides of the curved portions and including two straight and parallel bag supporting bars rigidly connected right angularly at one end to the side members adjacent to the junctions of the straight and curved portions and supported at their other ends by two bars connected to the free ends of the curved portions, and a pair of supporting wheels mounted on the truck respectively adjacent to and rotatable on an axis extending through the brackets, said axis being disposed transversely of the truck intermediately between the ends of said curved portions.

2. A baggage truck comprising a relatively long body providing a bag supporting platform at one face and cooperating bag supporting means extending outwardly of said face at one end of the truck, a pair of coaxial supporting wheels on the truck at said end, a bag supporting frame pivoted to said end of the truck for movement from a folded position adjacent to said face to an extended position substantially right angular thereto, stop means for supporting the frame in extended position, floor engaging abutment means on said end of the truck forwardly of the wheel axis, and means connecting the frame to the abutment means and operative thereon to move the abutment means downwardly to a forward floor engaging position when the frame is pivoted to extended position and to a rearward retracted position when the frame is moved to folded position.

3. The baggage truck defined in claim 2 in which the abutment means is pivoted to the truck and the connecting means includes a link connecting the frame with the abutment means.

4. A baggage truck comprising a relatively long body providing a bag supporting platform at one face and cooperating bag supporting means extending outwardly of said face at one end of the truck, a pair of coaxial supporting wheels on the truck at said end, a bag supporting frame pivoted to said end of the truck for movement from a folded position adjacent to said face to an extended position substantially right angular thereto, stop means for supporting the frame in extended position, the bag supporting platform being inclined forwardly from the vertical and the center of gravity of the truck being forward of the wheel axis when the frame is in folded position and the forward end of the truck and the wheels are in truck supporting engagement with a horizontal floor surface, floor engaging abutment means on said end of the truck forwardly of the wheel axis, and means connecting the frame to the abutment means and operative thereon to move the abutment means to a forward floor engaging position when the frame is pivoted to extended position and to a rearward retracted position when the frame is moved to folded position, said engagement of the abutment means with the floor when in said forward position being adapted to maintain the bag supporting platform substantially vertical.

5. The baggage truck defined in claim 1 plus an axle at said axis rotatably mounting the wheels at its ends, a bag supporting frame comprising a U-shaped tube having the free ends of its two legs pivoted on the axle, said frame extending outwardly from the axle and pivotally movable thereabout from a folded position adjacent to the said face to an extended position substantially right angular thereto, two spaced stop abutments on the truck forwardly of the axle for supporting the frame in extended position, and a spring on the axle normally holding the frame in folded position.

6. A hand truck comprising a frame of tubular material having two relatively long and spaced parallel portions, means connecting said portions to form a bag supporting platform at the top face of the truck, cooperating bag supporting means extending outwardly of said face at the bottom end of the truck, a pair of coaxial supporting wheels on the truck at said bottom end, said tubular frame portions extending toward each other at the top end of the truck and providing a pair of coaxial hand gripping portions at one side of a gap midway therebetween, and a roller bearing carried by the truck in said gap for supporting the truck in suspended position on a rail.

References Cited in the file of this patent

UNITED STATES PATENTS

| | | |
|---|---|---|
| D. 157,589 | Hartenbach | Mar. 7, 1950 |
| 980,485 | Brown | Jan. 3, 1911 |
| 1,255,484 | Stephens | Feb. 5, 1918 |
| 1,428,180 | More | Sept. 5, 1922 |
| 1,432,037 | Russell | Oct. 17, 1922 |
| 1,945,969 | Earle et al. | Feb. 6, 1934 |

FOREIGN PATENTS

| | | |
|---|---|---|
| 696,969 | France | Oct. 21, 1930 |
| 280,482 | Great Britain | Nov. 17, 1927 |

Disclaimer 2,792,233.—*Wells Stackhouse*, Havertown, Pa. BAGGAGE TRUCK. Patent dated May 14, 1957. Disclaimer filed Dec. 16, 1957, by the assignee, *American Locker Company, Inc.*

Hereby enters this disclaimer to claim 1 of said patent.

[*Official Gazette January 21, 1958.*]